Jan. 29, 1963   E. F. KORALESKY   3,075,267
ROPE CLAMP
Filed Jan. 6, 1960
FIG. 1
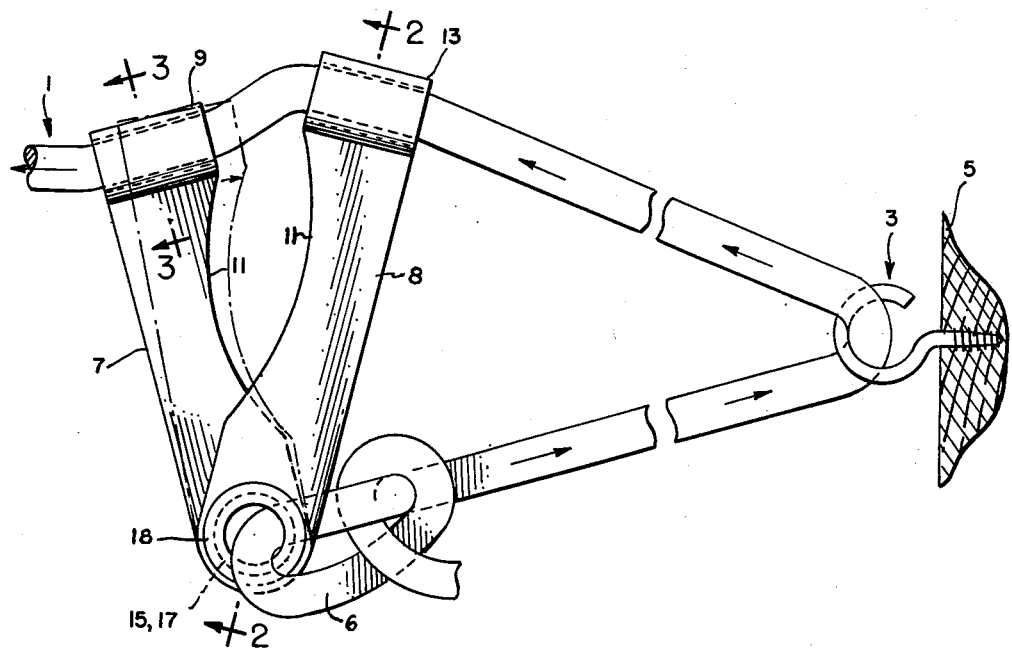
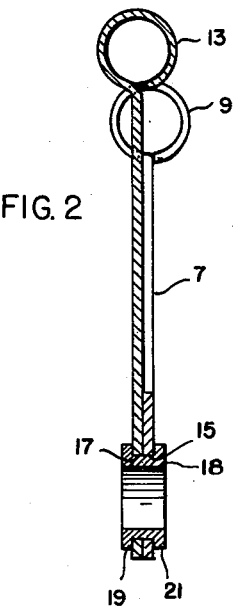
FIG. 2
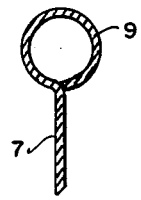
FIG. 3
*INVENTOR:*
EDWIN F. KORALESKY
BY
ATT'YS

United States Patent Office 3,075,267
Patented Jan. 29, 1963

3,075,267
ROPE CLAMP
Edwin F. Koralesky, Aurora, Ill.
(2415 Marshall St., Manitowoc, Wis.)
Filed Jan. 6, 1960, Ser. No. 751
4 Claims. (Cl. 24—134)

This invention relates to an improved rope holding device and, more particularly, to an improved rope clamp for firmly securing one end of a rope to an intermediate portion thereof to form a loop of predetermined size.

More particularly, in securing various objects to each other by the use of a rope, such as a tent to a tent stake or a tarpaulin to the sides of a truck, or for stretching and securing a rope between two fixed points, it is often desirable to use a rope which can be varied in effective length to accommodate a plurality of distances between objects and also to provide tension on the rope when secured between the objects. Further, it is often desirable when securing a rope to an object to have the rope extend around the entire perimeter or diameter thereof to effect an adjustable and yet firm holding.

In each of the previously mentioned situations the use of a loop at one end of the rope, which loop can be varied in size and which can be immoveably fixed with respect to an intermediate portion of the rope is called for.

While ropes may be provided with various types of tying knots to accommodate a plurality of situations, it is particularly noteworthy that no knot has yet been provided which can be applied easily without a loss of rope tension, which can be quickly adjusted to increase or decrease rope tension, and which can be instantaneously released to permit loosening or removal of the rope. Although a clamping means is called for, no clamping means has previously been devised to accomplish all of the aforesaid functions with positive security.

Therefore, it is a primary purpose of this invention to provide a rope clamp for securing one end of a rope to an intermediate portion thereof which clamp totally prevents rope slippage therethrough in both directions, which can be applied to a rope previous to affixing the rope with respect to objects, which can be easily and quickly adjusted to increase or decrease rope tension, which will hold the rope more securely in proportion to the tension on the rope, and which can be instantaneously released to permit rope loosening or removal.

Further objects and advantages of this invention will become evident from the examination of the particular description and the specific embodiment shown in the drawings in which:

FIGURE 1 is a side elevational view of a preferred embodiment of the subject rope clamp invention as it would appear in actual usage;

FIG. 2 is an elevational partly sectioned view as taken on line 2—2 of FIG. 1; and FIG. 3 is a fragmentary sectional elevational view, as on line 3—3 of FIG. 1, showing a rope receiving tube formed on the end of one of the clamping arms.

As best seen in FIG. 1, the rope clamp of the present invention is shown being used with a rope 1 which extends through a hookeye 3 screwed into a wall or other fixed object 5 and which rope terminates in an end 6 which is secured through the pivoted end of the rope clamp as will be further described. Although the present clamp is shown as used with a hookeye it is to be understood that this is merely representative of a large variety of uses and objects in connection with which it is appropriately designed for use. In actual usage, the forward end of the rope indicated generally at 1 is usually under tension in the direction indicated by the arrow; namely, outwardly from the fixed wall 5. The opposite end of the rope secured to the pivoted end of the clamp and extending through the hookeye 3 is under tension in a reverse direction as indicated by arrow shown on this portion of the rope.

The rope clamp is comprised of a forward clamp arm 7 and a rearward arm 8 each of which is stamped or otherwise formed from flat sheet metal or other suitable material and each of which extends outwardly, radially from a common pivot axis, to terminate in a generally cylindrical elongated rope receiving tube, as at 9 and 13 respectively. Each of these rope receiving tubes 9 and 13 extends generally perpendicularly with respect to the axis of the corresponding elongated clamp arm 7 or 8 and is shown as having a diameter somewhat greater than that of the rope, while having a length greater than the diameter of the rope. In the embodiment shown the length of each tube is substantially twice that of the rope diameter and the axes of the tubes lie in planes normal to the pivot axis of the arms.

The pivoted ends of the clamping arms opposite to the tubes are each formed with an inwardly spaced aperture, as at 15 and 17 respectively, for the reception of a grommet 18. Each arm is also formed with its inner edge inwardly recessed or concaved, as at 11, to permit the insertion of the user's fingers between the two arms for easily separating them when the rope receiving tube portions are closed together, in rope clamping position.

As shown, the apertured ends of the respective elongated clamp arms are pivotally secured together by means of a cylindrical grommet 18 which is passed through the aligned apertures and peened over as at 19 and 21 to secure the arms together for pivotal movement. The apertured central portion of the cylindrical grommet receives the ultimate end of the rope which is secured thereto.

It is to be particularly noted that the grommet and two rope receiving tubes are substantially in the same plane while the forward clamp arm 7 is radially shorter than the rearward clamp arm 8 by an amount substantially equal to the diameter of the tube 13. The purpose of this is to effect an offset relationship between the tubes which forces the rope, threaded through the tubes, to divert acutely outwardly, from its normal aligned path between the hookeye 3 and the tube 9, which tends to cause the forward arm 7 to rotate rearwardly toward clamp arm 8 to clamp the rope therebetween when tension is applied in the direction of the arrows.

In normal usage, the end of the rope 7 is inserted through the first rope receiving tube 9, through the second rope receiving tube 13, around the hookeye 3, and then back to the pivoted end of the clamp and through the cylindrical grommet 18 to which it is tied. Next the user's fingers are inserted into the space between the arms, formed by the respective recessed edge portions 11 and the arms are spread apart to permit the portion of the rope under rearward tension to be moved outwardly or inwardly as may be desired to effect the proper length to bridge the space between the wall 5 and the object to which the end of the rope 1 will be secured or to increase or decrease rope tension therebetween. When the rope has been thus adjusted, the clamp arms are then pushed toward each other into the position indicated by the solid lines in FIG. 1, or the forward arm is pulled into the position indicated by the dotted lines in FIG. 1. In the event the arms are manually pushed together no closer than indicated by the solid lines in FIG. 1, the application of tension outwardly on the rope end 1 will cause the arms to move closer together into the clamping position indicated by the dotted lines. When it is desired to release the rope, the clamp arms are merely separated to release all clamping action on the rope.

The force diagram relating to this particular rope clamp must be understood for a full appreciation of its advantages. As indicated in FIG. 1, when the rope end 1 is pulled outwardly as indicated by the arrows, a tension is effected along its entire length outwardly from the wall 5. The portion of the rope which is beyond the hookeye 3 and which is secured to the grommet 18 is thus caused to have a tension acting in the direction of wall 5, as indicated by the arrows thereon. The particular advantage of this invention resides in the positive connection of the rope end to the annular grommet 18 which acts as a leverage point to translate the rearwardly directed force on the tied end of the rope into a torque action about the tube end of the arm 7 which, together with the tension on the rope 1, effects a tighter more effective clamping action through the tendency of the arm 7 to move toward the arm 8 in the direction of the small arrow as shown at the upper part of the broken line representation of the clamp arm 7 in FIGURE 1.

More particularly, as tension is applied to the end of the rope 1 and this force is transmitted down the length of the rope around the hookeye 3 to the pivoted ends of the clamp arms, the grommet end of the clamp tends to be moved inwardly toward the wall 5 pivoting around the main run of the rope and causing the clamp arms 7 and 8 to be rotated slightly to the left as viewed in FIG. 1. This torque effected rotation of the clamping arms has numerous effects all cooperating and combining to cause the arms 7 and 8 to close toward each other to achieve a more firm clamping action. First, the rope receiving tube 13 is caused to attain a greater angularity with respect to the portion of the rope between the hookeye 3 and the rearwardmost end of the tube 13. This serves to increase the bite which the lower rearward edge of the tube 13 takes into the rope, increasing friction and serving to prevent rope movement in either direction. However, even more important is the rotation of the forward rope receiving tube 9 in a counterclockwise direction as viewed in FIG. 1. This results in reducing the rope bite taken by the upper rear edge of this tube, which, because of the force of the rope acting upwardly on the forward upper edge of the tube causes the tube to move to the right into closer relation with tube 13, which reestablishes the bite taken by the rear upper edge and which is further augmented by the increased angularity which must be assumed by the rope between the tubes 9 and 13 because of the closeness of the arms. Of course, this increased angularity results in a better "bite" which serves to secure the clamp in a most positive manner.

Thus, in the final clamping position, it is the closeness of the two arms which determines the angularity of the rope between the two rope receiving tubes which, in turn, determines the bite to be taken by the tubes on the rope to prevent movement of the rope therethrough. In turn, this closeness of the arms, while initially established manually, is actually augmented by the torque resulting from the utilization of the rearwardly directed force acting on the grommet end of the clamp device. Further, the clamping elements are self locking in the clamped position so that any flexing or momentary relaxing of tension in the main run 1 of the rope will not loosen or disengage the clamp device from its set position.

Therefore, it is seen that by the combination and arrangement of elements described an improved rope clamp has been provided which may be used to secure one end of a rope to an intermediate portion thereof and totally prevent rope slippage relative to the clamp in both directions; which can be rapidly and simply applied to a rope prior to use; which can be readily adjusted while the rope is in actual use to increase or decrease rope tension; which utilizes the rearward component of rope tension as a torque force to effect a more secure increased clamping action directly related to rope tension; which can be instantaneously released to loosen the rope; which will not loosen its clamping grip upon any release of tension on the rope; and which is simple, rugged and inexpensive in construction, and which embodies only a minimum of parts.

Although but one embodiment of this invention is herein shown and described it will be understood that details of the construction shown may be altered or omitted without departing from the spirit of this invention as defined by the following claims.

I claim:

1. A rope clamp comprising a first elongated clamp arm including a rope receiving tube at one end, a second clamp arm longer than said first arm and including a rope receiving tube at one end, the other end of each of said arms having a circular aperture axially normal to the plane of the axis of the respective tube, and an annular grommet extending through said apertures and pivotally securing the said other ends of said arms together and providing means for receiving and securing one end of a rope thereto, the length of said second clamp arm from the axis of said grommet being substantially equal to the length of the first clamp arm from the axis of the grommet plus the inside diameter of the rope receiving tube on said first clamp arm.

2. A rope clamp comprising an elongated clamp arm, a second elongated clamp arm longer than said first arm, tubular rope receiving means at one end of each of said arms, the rope extending through said tubular means, the other end of each of said arms having a circular aperture, and an annular grommet in said apertures for securing said arms pivotally together, the distance from the axis of said grommet to the far side of the inside surface of the tubular means on the first clamp arm being less than the distance from said axis to the near side of the opening in the tubular means on the second clamp arm plus the diameter of the rope extending therethrough, each of said tubular means being of a length greater than the diameter of the opening therethrough and lying in substantially the same plane as said grommet, and one end of the rope being secured at said grommet.

3. A rope clamp comprising an elongated flat blade-like clamping arm terminating at one end in a rope receiving tube axially parallel with a flat surface plane of the arm, the axes of said tube and said arm being substantially perpendicular to each other, a second longer flat blade-like clamp arm terminating at one end in a rope receiving tube axially parallel with a flat surface plane of the arm, the axes of said second arm tube and said second arm being substantially perpendicular to each other, the opposite end of each of said arms having a circular aperture therethrough, and an annular grommet extending through said apertures and pivotally securing said arms together in parallel planes with the respective tubes at different distances from the grommet axis, said grommet providing means for securing one end of a rope thereto and said tubes and said grommet being substantially in the same plane, said rope receiving tubes being of substantially the same inside diameter and the axis of the tube on the second arm being offset from the axis of the tube on the first arm by an amount substantially equal to the inside diameter of the tube on the first arm.

4. A rope clamp comprising a pair of flat blade-like arms each having an aperture at one end, said arms having their apertures axially aligned and being pivotally connected together by a grommet secured in the aligned apertures whereby the arms are independently swingable about the axis of the grommet in respective parallel planes, one of said arms being longer than the other and each of said arms having a tubular rope receiving means at its outer end, the tubular means on each arm being disposed with its axis lying in a plane normal to the pivot axis of the arms, and each of said tubular means being of greater length than the diameter of the opening therethrough, both of said tubular means having substantially the same inside diameter and the axis of one being offset radially from the axis of the other by an amount substantially equal to said inside diameter.

References Cited in the file of this patent

UNITED STATES PATENTS

| | | |
|---|---|---|
| 368,256 | Tilman | Aug. 16, 1887 |
| 678,866 | Duvall | July 23, 1901 |
| 813,457 | Seebach | Feb. 27, 1906 |
| 1,178,716 | Grippen | Apr. 11, 1916 |
| 1,793,330 | Magnant | Feb. 17, 1931 |

FOREIGN PATENTS

| | | |
|---|---|---|
| 308,058 | Great Britain | Mar. 21, 1929 |